Patented Feb. 1, 1927.

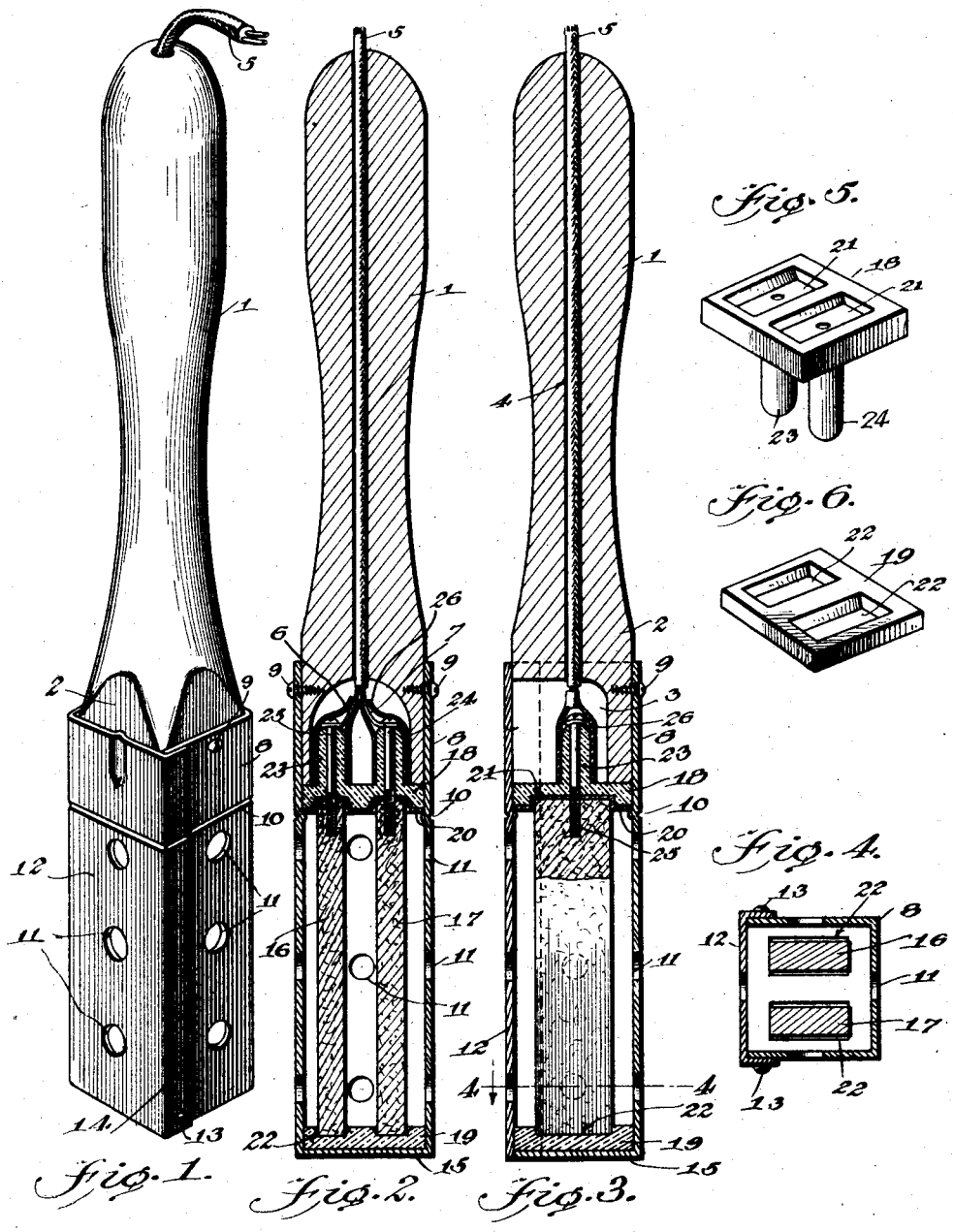

1,615,819

UNITED STATES PATENT OFFICE.

LONZO W. ARMSTRONG, OF LAS ANIMAS, COLORADO.

ELECTRIC WATER HEATER.

Application filed March 29, 1926. Serial No. 98,264.

This invention relates to improvements in electric water heaters, particularly of the immersion type, and an object of the invention, in addition to making the shell square or non-circular so that it will not roll, is to so improve the connection between the conducting wires and the heating elements that the danger of short circuiting the conducting wires by the collection of moisture is made impossible under ordinary circumstances.

Other objects and advantages appear in the following specification, reference being had to the accompanying drawing, in which—

Figure 1 is a perspective view of the improved water heater,

Figure 2 is a central longitudinal section thereof.

Figure 3 is a similar section taken in a plane at right angles to the plane in which Figure 2 appears.

Figure 4 is a detail cross section on the line 4—4 of Figure 3,

Figure 5 is a detail perspective view of the upper porcelain support,

Figure 6 is a detail perspective view of the lower porcelain support.

This heater is intended for heating small quantities of water quickly. A small amount of water, such as might be contained by an ordinary drinking glass, can be heated to a high degree of temperature, even to the point of boiling by simply immersing the metallic part of the device for a few seconds of time, the electric current necessarily being turned on. The applicability of the heater is obviously rather wide, but it is intended primarily for the use of doctors and dentists, or others who have frequent need for hot water on a moment's notice.

In order that the heater may be used in safety, i. e. without danger of receiving an electric shock when the current is turned on, the handle 1 is made of some insulating material, preferably wood. The handle is of more or less conventional shape, but the lower extremity 2 ends in a square or other non-circular cross sectional shape which is provided with a recess 3 for a purpose presently apparent. A bore 4, extending longitudinally of the handle 1, communicates with the recess 3, and serves to contain the cable 5 of the house electric current. The cable has two wires 6 and 7 as shown in Figure 2. The shell 8 may be regarded as a substantial continuation of the handle 1. It is applied to the non-circular extremity 2 and secured by screws 9 or other suitable fastening means. The cross sectional shape of the shell 8 corresponds with that of the extremity 2, and is therefore non-circular. There is an object in making it so: It is intended that when the metallic part of the heater is immersed in a glass of water that it shall not roll but rather stay in place where it is put. The shell 8 is made of some suitable metal. enameled or otherwise attractively decorated as may be found desirable in practice.

A ridge 10 pressed into the shell 8 marks the high water line. Water enters the interior of the shell through openings 11. One side 12 of the shell is hinged at 13, providing a door through which access to the interior of the shell may be had for the purposes of inspection, making connections, etc. The edges of the door are flanged at 14, and the rivets. which constitute the hinge points pass through the flanges into adjacent parts of the shell 8. The ridge 10 is continued around the hinged side or cover 12 as shown, and the cover has holes for the circulation of water as do the other sides of the shell. The shell has a closed bottom 15 which is employed as a support.

Heating elements 16 and 17, of carbon or other suitable material. occupy the shell 8 in which they are situated in spaced relationship as shown in Figure 2. The upper and lower extremities of the heating elements are supported by porcelain blocks 18 and 19 herein known as the upper and lower supports. These blocks fit the shell 8, being snugly disposed between the lower extremity of the non-circular portion 2 of the handle and the ridge 10. A piece of mica 20 is interposed between the lower surface of the block 18 and the adjacent ridge 10, the purpose of the mica being to cover the entire lower surface of the porcelain block 18, and to protect the porcelain from coming into contact with the water and breaking should it so happen that the porcelain is hot and the water is cold.

Grooves 21 and 22 in the respective upper and lower blocks 18 and 19 receive the adjacent ends of the heating elements and serve to hold the latter firmly in place without moving about. It is noted that the mica piece 20 is shaped to fit the contour of the grooves in the upper support, the sides of these grooves being beveled to avoid extremely sharp bends in the mica piece. Although a mica covering is not placed upon the lower support 19, it may be in practice, and anticipating such use the sides of the grooves 22 are beveled also. The lower support will probably not get so hot as the upper support, and the need for protection is not so urgent. Moreover, cracking of the upper porcelain support would permit the seepage of water into the recess 3 thereby short circuiting the wires. Cracking of the lower porcelain support would not be so dangerous.

Tubular projections 23 and 24 from the upper porcelain support 18 receive screws 25 which not only secure the heating elements but serve as the terminals thereof for the connection of the wires 6 and 7. In order to increase the protection of the wire ends and screw terminals, these and the tubular projections are sheathed in rubber as at 26. This rubber sheathing may consist of flexible rubber tubing drawn over the parts concerned.

The operation is readily understood. The metallic shell 8 is immersed in the water to be heated which reaches the heating elements 16 and 17 through the holes in the sides of the shell and the cover 12. The shell is made of square or other non-circular shape by preference thereby preventing the heater from rolling either when immersed in the water or when it is laid down upon a table.

The handle 1 is preferably made of wood so that the user will not be endangered by a shock from the electricity in handling the instrument. Being of wood, the handle is relatively light, and the heater is therefore not top heavy when immersed in a glass of water.

As has been pointed out the ridge 10 is intended to mark the high water line. In other words, the user should see to it that the water level comes approximately even with the ridge 10. The ridge serves the additional purpose of a rest, limiting the distance to which the upper porcelain support 18 can be inserted from the upper end of the shell. The non-circular portion 2 of the handle which follows holds the upper support firmly against the ridge, the arrangement shown making it possible to make quite a tight joint. Such joint is desirable so that water may not leak into the recess 3 and cause possible short circuiting of the wires 6 and 7. The mica piece 20 protects the upper porcelain support from excessive heat so that there will be no danger of cracking should the heater be subjected to quick changes in temperature.

While the construction and arrangement of the improved heater is that of a generally preferred form, obviously modifications and changes may be made without departing from the spirit of the invention or the scope of the claims.

I claim:—

1. An electric heater comprising a perforated non-circular shell having a closed bottom, and a ridge adjacent to the opposite edge, heating elements located in the shell, a pair of insulating supports for said elements, one resting on the closed bottom, the other upon said ridge, said support having grooves receiving the longitudinal edges of the elements, a handle having a non-circular extremity inserted in and fitting the open end of the shell and pressing the adjacent insulating support toward said ridge, thereby holding the parts firmly together, means securing the shell to said extremity of the handle, an electric cable passing through a bore in the handle and having a pair of conductor wires, and screws both serving as terminal connectors for the wires and securing the heating elements to the adjacent insulating support.

2. An electric heater comprising a perforated shell of non-circular cross section having a closed bottom and a ridge adjacent to the opposite open end, a plurality of heating elements located in the shell, a pair of insulating supports consisting of porcelain blocks resting respectively on the closed bottom and upon the ridge, said supports having grooves receiving the longitudinal edges of the elements, a mica piece inserted between the ridge and the adjacent blocks protecting the porcelain from heat, said piece being bent to fit the groove in said blocks, a handle having a non-circular extremity fitting in the open end of the shell and contacting the adjacent porcelain blocks, said extremity having a recess, projections extending from said blocks substantially in line with the associated heating elements and occupying said recess, an electric cable extending through a bore in the handle and having conductor wires exposed in said recess, terminal screws situated in the projections both securing the wires and passing into the heating elements to hold them in place upon the blocks, insulating sheathing means fitted over the projections and wires to prevent short circuiting of the terminal screws by the collection of moisture in said recess, a movable side hinged upon the shell providing a door permitting access to said elements, and flanges upon the door fitting over adjacent parts of the shell to receive hinge pins.

LONZO W. ARMSTRONG.